United States Patent  [11] 3,634,100

| [72] | Inventors | Michel Paulin Valere Fondu<br>Merksem;<br>Marcel Guillaume August Willems,<br>Borgerhout-Antwerpen, both of Belgium |
|---|---|---|
| [21] | Appl. No. | 803,086 |
| [22] | Filed | Feb. 27, 1969 |
| [45] | Patented | Jan. 11, 1972 |
| [73] | Assignee | Lever Brothers Company<br>New York, N.Y. |
| [32] | Priority | Mar. 1, 1968 |
| [33] | | Luxembourg |
| [31] | | 55.603 |

[54] MARGARINE FAT CONTAINING RANDOMIZED FAT COMPONENT
8 Claims, No Drawings

| [52] | U.S. Cl. | 99/122 M |
|---|---|---|
| [51] | Int. Cl. | A23d 3/00 |
| [50] | Field of Search | 99/122 MO, 122, 123, 118 |

[56] References Cited
UNITED STATES PATENTS

| 2,996,388 | 8/1961 | Lindsay | 99/118 |
| 3,268,340 | 8/1966 | Babayan | 99/122 X |
| 3,353,964 | 11/1967 | Seiden | 99/122 X |

*Primary Examiner*—Joseph M. Golian
*Attorneys*—Louis F. Kline, Jr., Melvin H. Kurtz and Edgar E. Ruff ABSTRACT: The invention provides margarine fat formulations having a high content of polyunsaturated fatty acids from which margarines can be prepared capable of wrapper- or tub-packaging. The hard fat component of the fat is randomized and is free from hydrogenated fats. It may be obtained by interesterifying coconut and palm fats with for example palm stearine, or by randomizing the glycerides of a corresponding mixture of the fatty acids.

MARGARINE FAT CONTAINING RANDOMIZED FAT COMPONENT

The invention relates to fat compositions, which may be used in the preparation of margarines having a high content of polyunsaturated fatty acids, and to margarines made therefrom.

The term "fat" is used herein to include both fatty acid triglycerides which are solid at about 20° C., and triglycerides which are liquid at that temperature and which are commonly described as "oils." The term "hard fat" refers herein to fatty acid triglycerides, of which the majority of the fatty acids are saturated and which are solid at ambient temperatures. A "margarine fat" is a fat blend which is suitable for use as the sole fat in margarine.

Margarines with a high content of polyunsaturated fatty acids and a relatively low content of saturated fatty acids are widely believed to be dietetically beneficial and are therefore of particular interest. Such margarines should be easily spreadable and should show the smallest possible degree of oil exudation at room temperatures, and this requirement sets a limit to the amount of liquid fat, which is the source of polyunsaturated fatty acids, in these margarines. This property is particularly of importance for margarines of this kind, if they are sold in wrappers. When wrapper margarines containing a high amount of liquid fat are stored at temperatures of 20° C, or even more, oil exudation may occur as a result of pressure due to the weight of one package on another, in consequence of which liquid fat may leak through the parchment wrap and will become rancid on contact with air.

A margarine to be packed in wrappers should therefore be less liable to oil exudation than a margarine to be packed in tube, and therefore the latter type of margarine may contain a higher amount of liquid fat than the former type.

In our published Dutch Pat. application No. 6,708,998 a margarine fat is described comprising a blend of a liquid fat having high polyunsaturated fatty acid content with 8–15 percent of an interesterified mixture of a hardened vegetable oil substantially free from glycerides of fatty acids having less than 16 carbon atoms with fully hardened palm kernel oil in specified proportions. In this composition the saturated acid content of both components of the interesterified mixture providing the hard fat of the margarine fat is enhanced by hydrogenation to permit blending with desirably high amounts of the liquid fat while providing the melting behavior necessary to avoid oil exudation. Nevertheless the consistency of the margarine product will not readily permit wrapper packaging at the usual temperatures i.e., 15–25° C. at which this operation is carried out and the product must be packaged in tubs.

The present invention provides a margarine fat having a high polyunsaturated fatty acid content which is however free from hardened fat, i.e., hydrogenated hard fat. According to the invention therefore a margarine fat comprises 25–90 percent of a liquid fat, containing at least 40 percent of polyunsaturated fatty acids and 10–75 percent of a randomized unhydrogenated hard fat component having a fatty acid content corresponding to a mixture of:

A. a fat of the coconut fat type,
B. a fat of the palm fat type, and
C. a fat with at least 80 percent of saturated fatty acids including at least 60 percent of fatty acids of a chain length of 16 carbon atoms or more in such proportions that the dilatation value of the margarine fat at 35° C. is not more than 150 but at 20° C. is at least 100.

The invention provides margarine fat with a high content of polyunsaturated fatty acids from which either wrapper or tub margarines may be prepared, depending on the amount of the hard fat component in the fat composition, and which avoids the necessity of hardening natural or artificial glycerides before they are used.

Suitable wrapper margarines may contain from 10–50 percent of polyunsaturated fatty acids and from 30–60 percent of saturated fatty acids, whereas tub margarines of this type may contain from 20–70 percent of polyunsaturated fatty acids and from 10–40 percent by weight of saturated fatty acids. The ratio of polyunsaturated fatty acids to saturated fatty acids should preferably be between 1:1 and 6:1, which means that wrapper margarines should preferably contain 30 or more of polyunsaturated fatty acids and tub margarines preferably 60 percent or more of said acids.

In this specification all parts, proportions and percentages are by weight; the amounts of fatty acids in a fat are based on the total amount of fatty acids in said fat, and the amounts of fats are based on the total amount of fat in the fat composition.

The consistency of margarines prepared by cooling, working and crystallizing an emulsion of margarine fat and an aqueous phase depends on the solids content of the fat phase at different temperatures. The solids content can be calculated from the dilatation values, as described in "The Journal of the American Oil Chemists' Society," Volume 31 (1954), pages 98–103. The dilatation values quoted here were determined by the method described by Boekenoogen in "Analysis and Characterisation of Oils, Fats and Fat Products," 1964, Interscience Publishers, London pages 143–145.

A wrapper margarine should have a fat composition of a $D_{20}$ of at least 350. Preferably such a margarine should have a $D_{15}$–$D_{25}$ of at least 200, in order to obtain a sufficiently cool taste. A tub margarine should have a $D_{20}$ of at least 100, preferably at least 180. As such tub margarines, because of their high liquid fat content, should generally be stored in refrigerators and therefore consumed at low temperatures, no specific requirements are set to the difference between the dilatation values at 15° and 25° C. It may even be advantageous to prepare margarine fats for tub margarines with a low $D_{15}$–$D_{25}$, so that the margarine has an almost constant consistency over a wide temperature range, making it easily spreadable both at room and at refrigerator temperature. Both the wrapper and the tub margarine should have a dilatation value of not more than 150 at 35° C. and preferably not more than 100 at that temperature, in order to arrive at good eating qualities, i.e., thin and quick melting of the tongue. (By $D_t$ is meant herein the dilatation value at $t°C$.).

The randomized hard fat component of this invention includes both interesterified mixtures of the three constituents A, B and C and fats prepared by esterifying the appropriate fatty acids in corresponding proportions with glycerol. Where the hard fat component is prepared by interesterification constituent A is preferably selected from the natural fats of the coconut fat type, e.g., coconut, palm kernel and babassu fat, which fats contain at least 40 percent of lauric acid or shorter chain fatty acids.

As constituent B a natural semiconsistent fat of palm fat type may be used. Suitably fats of this class are tallow and palm fat itself, the latter being preferred because of its better flavor stability.

As constituent C of the hard fat component palm oil stearine having a melting point of 50°–60° C. may be used, which is obtained by fractionating a natural palm fat. The fractionation of the palm fat can be carried out in various known ways, e.g., by means of solvents, or in the presence of an aqueous solution containing a small amount of a detergent or by the dry fractionation method as described below.

In dry fractionating palm fat, the fat is heated to a temperature of 80° C., and then slowly cooled for 1 day to a temperature of 18°–20° C. The cooling is effected while slowly stirring. The cooled oil is subsequently heated for 3–4 hours to a temperature of 28° C. at which it is maintained for at least 4 hours. After crystallization the stearine fraction is separated by filtering in the usual way. The stearine fraction prepared in this way has an iodine value of 32–36 and is obtained in a quantity of 10–25 percent by weight.

The proportions of the fatty acids in the hard fat component are critical. For example, in the interesterification, too high a concentration of constituent C in the mixture leads to too high a dilatation value at 35° C. and too high a melting point. On the other hand, too small a quantity of constituent C may cause oil exudation. At an optimum content of constituent C, too small a quantity of constituent A may have an adverse effect on the difference between the dilatation values at 15° and 25° C., which reduces the organoleptic qualities of the final margarine.

The constituents A, B and C of the hard fat component may be used in a quantity of 25–50 percent, 15–45 percent and 15–45 percent respectively.

Constituent A is preferably used in an amount of 30–45 percent, constituent B in an amount of 20–40 percent and constituent C in an amount of 20–40 percent, based on the total amount of the hard fat component.

The margarine of the invention may, for instance, include a randomized hard fat component containing 40 percent of coconut or palm kernel fat, 30 percent of palm fat and 30 percent of palm stearine with a melting point of 50°–60° C., and can be packed either in wrappers or in tubs, depending upon the quantity of liquid fat present in the margarine fat.

The hard fat component may also be prepared by esterifying glycerol with about the same mixture of fatty acids as is present in a suitable interesterified mixture of constituents A, B and C e.g., as in the last-mentioned hard fat component, 0.5–2 percent capric acid, 25–32 percent lauric acid, 8–10 percent of myristic acid, 34–40 percent palmitic acid, 4–5 percent stearic acid, 15–20 percent oleic acid and 3–5 percent linoleic acid.

The interesterification treatment of the three constituents A, B and C of the hard fat component may be carried out batchwise or continuously using several catalysts, e.g., alkali metals, their hydroxides, alkoxides and soaps, sodamide and titanium tetraalkoxide.

The reaction may be carried out as follows:

The mixture of constituents A, B and C is dried to a water content below 0.03 percent and subsequently interesterified at a temperature of 110°–140° C. in a stirred vessel which has been kept under a vacuum of e.g., 2 mm. mercury, in the presence of 0.01–0.3 percent by weight of sodium ethoxide as a catalyst. After about 20 minutes the vacuum is released. The catalyst is destroyed by washing the interesterified mixture e.g., with 10 percent of an 0.4 normal aqueous lye solution. The interesterified mixture is then washed with water and dried as before.

The margarine fat of the present invention comprises a hard fat component in admixture with 25–90 percent of a liquid fat containing at least 40 percent of polyunsaturated fatty acids. For wrapper margarines the hard fat component may be mixed with 25–60 percent, preferably 40–55 percent, of liquid fat and for tub margarines with 50–90 percent, preferably 60–80 percent, of liquid fat. Liquid fats containing at least 40 percent by weight of polyunsaturated fatty acids are: safflower, sunflower, soybean, wheat germ, grapeseed, poppyseed, tobacco seed, rye, walnut, corn and sesame fat.

The invention will not be illustrated by the following examples:

EXAMPLE 1

A margarine fat for wrapper margarines was prepared from a hard fat component comprising a mixture of palm fat, palm stearine (melting point 55° C.) and palm kernel fat in a ratio of 30:30:40 which was completely interesterified in the manner as described above. The hard fat component was mixed in a ratio of 1:1 with a fat mixture consisting of 2.5 percent of sesame, 45.5 percent of safflower, 1 percent of maize and 1 percent of sunflower fat these percentages being based on the total 1:1 mixture.

The analysis of the margarine fat thus prepared according to the present invention was compared with that of a control sample consisting of a margarine fat prepared from the same constituents, the hard fat component of which was not, however, interesterified. The results appear in table I

TABLE 1

| Margarine | fat according to the invention | Control sample |
|---|---|---|
| Dilatation | | |
| $D_{15}$ | 560 | 400 |
| $D_{20}$ | 455 | 300 |
| $D_{25}$ | 325 | 290 |
| $D_{30}$ | 210 | 250 |
| $D_{35}$ | 135 | 205 |
| $D_{15}-D_{25}$ | 235 | 110 |
| Melting point | 32° C. | 33° C. |
| Oil exudation of margarine after storage at 20° C. | Could not be detected after 1 week. | Could already be detected after 3 days. |

The data obtained from this example show that the interesterification of the constituents of the hard fat component reduces the dilatation value at 35° C., to a value below 150 i.e., giving good eating qualities, increases the difference between the dilatation values at 15° and 25° C., thus conferring a cool-tasting effect and diminishes the exudation of oil, thereby improving the shelf life of margarine made from the fat.

It will also be observed that, with the same amount of liquid fat present, the dilatation value of the control sample is nevertheless too low for the preparation of margarine intended for wrapper packaging.

EXAMPLE 2

A portion of the hard fat component of example 1 was mixed with 2.5 percent of sesame, 68 percent of safflower, 1 percent of sunflower and 1 percent of maize fat in order to prepare a fat composition suitable for the manufacture of a margarine to be packed in tubs. The analysis of the margarine fat was again compared with that of a control sample consisting of a margarine fat prepared from the same constituents, the hard fat component of which was not, however, interesterified. The results appear in table 2.

TABLE 2

| Margarine | fat according to the invention | Control sample |
|---|---|---|
| $D_{15}$ | 260 | 230 |
| $D_{20}$ | 205 | 240 |
| $D_{25}$ | 150 | 205 |
| $D_{30}$ | 75 | 185 |
| $D_{35}$ | 40 | 160 |
| $D_{15}-D_{25}$ | 110 | 25 |
| melting point | 28.5° C. | 32° C. |
| Oil exudation of margarine after storage at 20° C. | None detectable after 3 days | None detectable after 3 days. |

The analyses show that without interesterification the control sample fails to give a good oral response because at 35° C. its dilation is too high.

On the other hand the dilatation values of the sample according to the invention while being substantially lower at 35° C. are nevertheless not markedly different at 15° and 20° C. and the product margarine is therefore readily spread at these temperatures.

EXAMPLE 3

In order to demonstrate that the hard fat component must be formed from an interesterified mixture of the three constituents A, B and C and that it is important to observe specific proportions for this mixture, a number of analyses of the mixture were carried out as follows:

TABLE 3

| | | Control Sample | |
|---|---|---|---|
| | (1) | (2) | (3) |
| Physical mixture — Palm stearine melting point 54° C., percent. | 25 | 25 | 20 |
| Coconut fat, percent | 26 | 30 | 32.5 |
| Safflower fat, percent | 49 | 45 | 47.5 |
| Dilatations: | | | |
| $D_{15}$ | 340 | 530 | 500 |
| $D_{20}$ | 255 | 370 | 360 |
| $D_{25}$ | 240 | 320 | 310 |
| $D_{30}$ | 204 | 280 | 280 |
| $D_{35}$ | 155 | 220 | 205 |

Products 1, 2 and 3 showed too high a dilation value at 35° C. for good oral response. Product 1 had too low a dilatation value at 20° C. for wrapper margarines and the difference between the dilatation values at 15° and at 25° C. was too small in the case of products 1 and 3 for providing a cool-tasting margarine. An attempt was made to prepare a better quality margarine fat by replacing part of the palm stearine by palm fat, but in the result the product was comparable with the control sample of example 1, as shown in table 4.

TABLE 4

| Palm stearine Melting point 54° C. | 15% control sample (4) physical mixture | Invention sample (6) Interesterified |
|---|---|---|
| palm fat | 15% | |
| coconut fat | 20% | |
| safflower fat | 50% | |
| Dilatation values | | |
| $D_{15}$ | 400 | 560 |
| $D_{20}$ | 300 | 450 |
| $D_{25}$ | 290 | 320 |
| $D_{30}$ | 250 | 210 |
| $D_{35}$ | 205 | 100 |
| Melting point | — | 32.5° C. |
| Oil exudation after 3 days at 20° C. | — | Nil |

The dilatation values given in table 4 for control sample 4 show that the addition of palm fat did not in itself make and improvement. A satisfactory product was however obtained by interesterification of the three constituents of the hard fat component.

This is illustrated by the analysis of the product 6 given in table 4.

The effect of varying the components in the margarine fat is also illustrated in table 5. Whereas product 6 contains proportions of constituents in accordance with the invention to provide the desired dilatation values, product 5 on the other hand contains too much of the constituent C i.e., palm stearin. It is however a simple matter to adjust the margarine fat composition to achieve the requisite dilatation values. If the $D_{35}$ value is too high, then the amount of constituent C must be decreased. On the other hand, too little of this constituent will lead to oil exudation and too low values for $D_{20}$.

TABLE 5

| | control sample (5) | margarine fat according to the invention (6) |
|---|---|---|
| palm stearine melting point 54° C. | 25% | |
| palm fat | 10% | |
| coconut fat | 15% | |
| safflower fat | 50% | |
| Dilatation values | | |
| $D_{15}$ | 400 | 560 |
| $D_{20}$ | 300 | 450 |
| $D_{25}$ | 290 | 320 |
| $D_{30}$ | 250 | 210 |
| $D_{35}$ | 205 | 100 |
| Melting point | | 33.5° C. | 32.5° C. |
| Oil exudation after 3 days at 20° C. | | Nil | Nil |

EXAMPLES 4 TO 7

Two margarine fats for the preparation of margarine to be packed in tubs and two margarine fats for the preparation of wrapper margarines were prepared from two different interesterified hard fat components I and II.

The composition of the hard fat components is shown in table 6.

Portions of each of these hard fat components were mixed with 70 percent and with 50 percent safflower fat to provide further examples 4 and 5 (for margarines to be packed in tubs) and 6 and 7 (for margarines to be packed in wrappers) of margarine fats according to the invention. Further details and analyses appear in table 6.

TABLE 6

| Hard fat components | | I | II |
|---|---|---|---|
| Interesterified — Palm kernel fat, percent | | 30 | 40 |
| Palm fat, percent | | 40 | 25 |
| Palm stearine (melting point 54° C.), percent. | | 30 | 35 |

| | Example | |
|---|---|---|
| Margarine fats with 70% safflower fat | 4 | 5 |
| Dilatation value: | | |
| $D_{15}$ | 260 | 280 |
| $D_{20}$ | 190 | 200 |
| $D_{25}$ | 140 | 150 |
| $D_{30}$ | 90 | 70 |
| $D_{35}$ | 50 | 30 |
| Melting point, °C | 33 | 32 |

| | Example | |
|---|---|---|
| Margarine fats with 50% safflower fat | 6 | 7 |
| Dilatation value: | | |
| $D_{15}$ | 485 | 530 |
| $D_{20}$ | 400 | 425 |
| $D_{25}$ | 280 | 310 |
| $D_{30}$ | 180 | 190 |
| $D_{35}$ | 120 | 40 |
| Melting point, °C | 35 | 34 |

NOTE.—None of the margarine fats showed oil exudation after 3 days' storage at 20° C.

What is claimed is:

1. A margarine fat having a dilatation value at 35° C. of at most 150 and at 20° C. of at least 100, consisting essentially of
   i. 25–90 percent of a liquid fat, at least 40 percent of its fatty acids being polyunsaturated fatty acids,
   ii. 10–75 percent of a randomized hard fat component having a fatty acid content corresponding to a mixture of
      A. 25–50 percent of a coconut fat type
      B. 15–45 percent of a palm fat type, and
      C. 15–45 percent of a palm fat stearine with at least 80 percent of saturated fatty acids of a chain length of at least 16 carbon atoms and having a melting point of 50°–60 C., said hard fat component being free form hydrogenated fat, and said percentages of A, B, and C being based on said hard fat.

2. A margarine fat in accordance with claim 1 wherein said components A, B, and C are present in the proportions of 30–45 percent 20–40 percent, and 20–40 percent, respectively.

3. A margarine fat in accordance with claim 1 wherein said hard fat component consists of 40 percent of a coconut type fat selected from the group consisting of palm kernel oil and coconut oil, 30 percent of palm fat, and 30 percent of palm stearine.

4. A margarine fat in accordance with claim 1 wherein said liquid fat is present in the proportions of 25–60 percent, and said hard fat is present in the proportions of 40–75 percent, said margarine fat being suitable for the preparation of wrapper margarine.

5. A margarine fat in accordance with claim 1 wherein said liquid fat is present in the proportions of 50–90 percent, and said hard fat is present in the proportions of 10–500 percent, said margarine fat being suitable for the preparation of tub margarine.

6. A margarine fat in accordance with claim 1, wherein said liquid fat is a member selected from the group consisting of sunflower, safflower, tobaccoseed, wheat germ, soybean, grapeseed, poppyseed, rye, walnut, corn and sesame oils.

7. A margarine fat in accordance with claim 1 consisting essentially of
 i. 50 percent safflower oil
 ii. 50 percent of a randomized hard fat component having a fatty acid content corresponding to mixture of
  A. 30 percent palm kernel fat
  B. 40 percent palm fat, and
  C. 30 percent palm fat stearine having a melting point of 54° C.

8. A margarine fat in accordance with claim 1 consisting essentially of
 i. 70 percent safflower oil
 ii. 30 percent of a randomized hard fat component having a fatty acid content corresponding to a mixture of
  A. 40 percent palm kernel fat
  B. 25 percent palm fat, and
  C. 35 percent palm fat stearine having a melting point of 54° C.

* * * * *